(No Model.) 2 Sheets—Sheet 1.
C. E. DURYEA.
WHEEL FOR VELOCIPEDES.
No. 459,699. Patented Sept. 15, 1891.
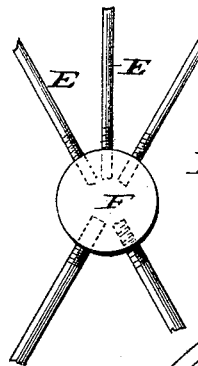
Fig. 3.
Fig. 1.
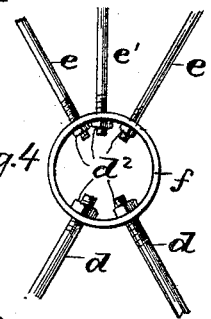
Fig. 4.
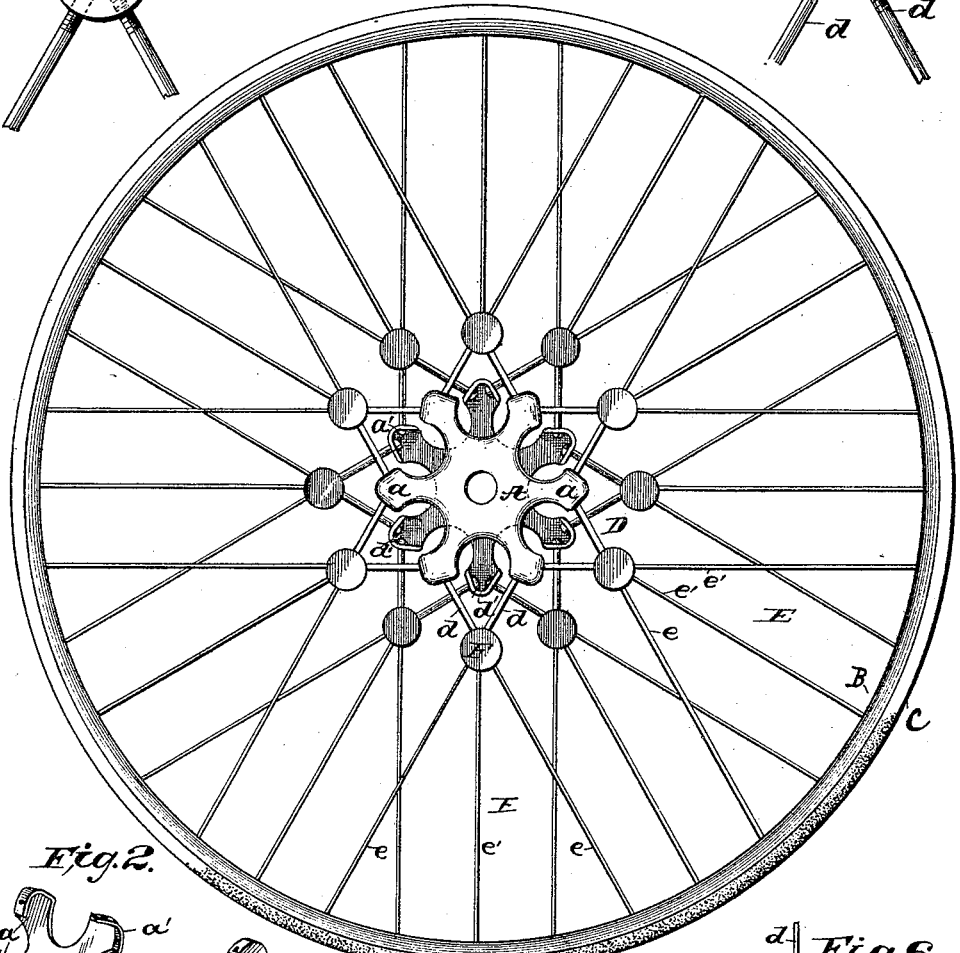
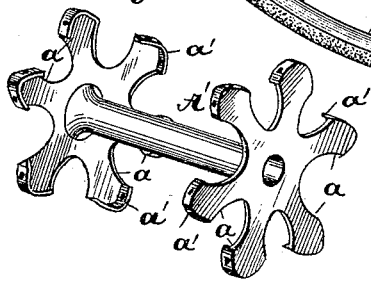
Fig. 2.
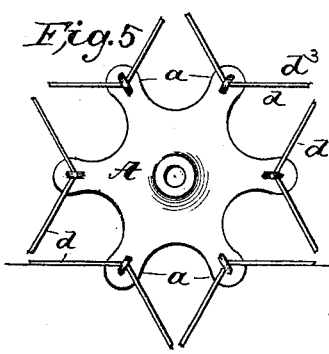
Fig. 5.
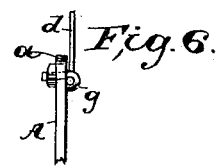
Fig. 6.
Witnesses:
F. H. Cornwall
G. M. Copenhaver
Inventor:
Charles E. Duryea
by E. T. Walker
his Attorney

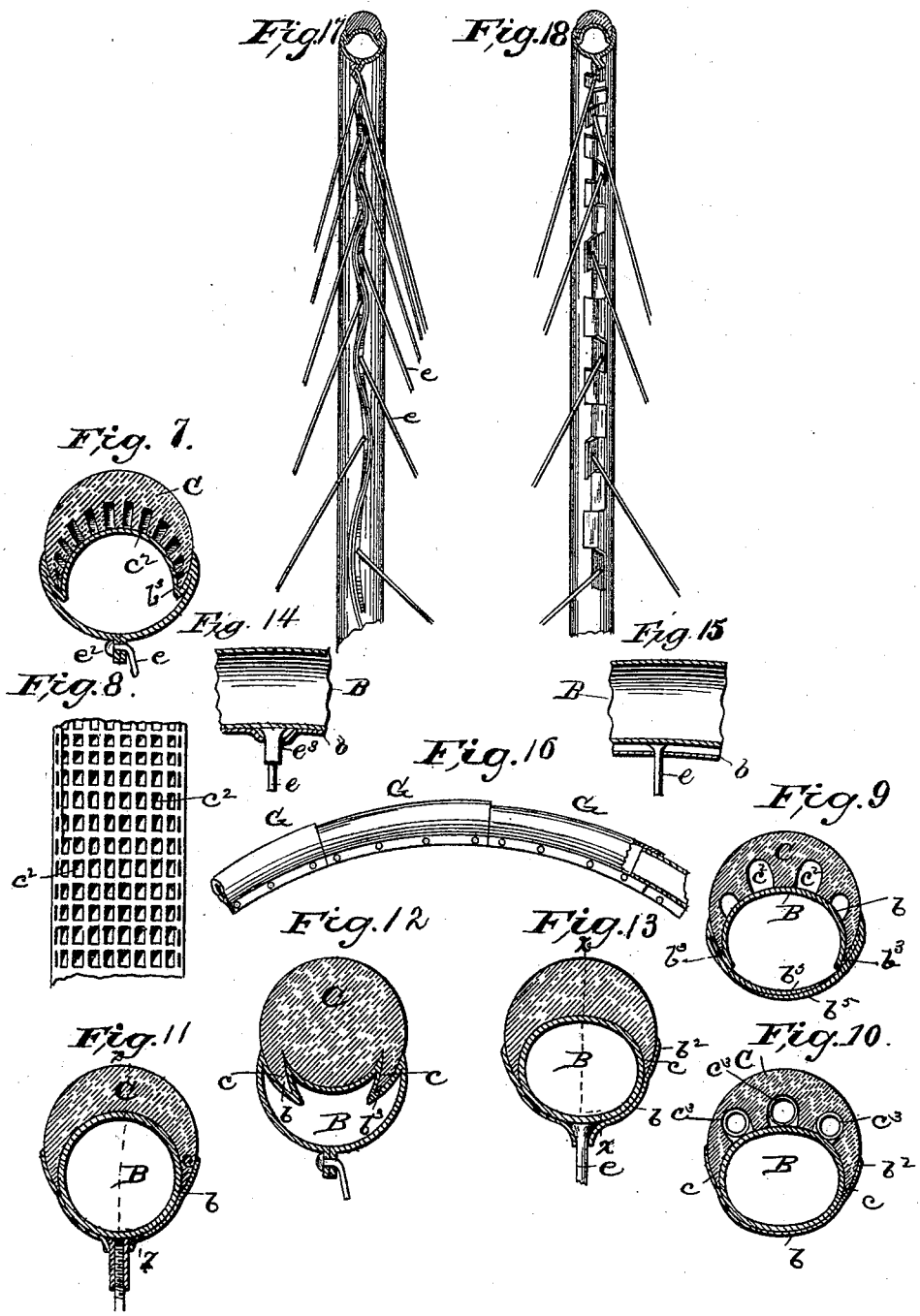

UNITED STATES PATENT OFFICE.

CHARLES E. DURYEA, OF ROCKAWAY, NEW JERSEY, ASSIGNOR TO THE ROUSE-DURYEA CYCLE COMPANY, OF PEORIA, ILLINOIS.

WHEEL FOR VELOCIPEDES.

SPECIFICATION forming part of Letters Patent No. 459,699, dated September 15, 1891.

Application filed October 23, 1890. Serial No. 369,060. (No model.)

*To all whom it may concern:*

Be it known that I, CHARLES E. DURYEA, a citizen of the United States, residing at Rockaway, in the county of Morris and State of New Jersey, have invented certain new and useful Improvements in Wheels for Velocipedes; and I do hereby declare the following to be a full, clear, and exact description of the invention, such as will enable others skilled in the art to which it appertains to make and use the same.

My invention relates to improvements in vehicle-wheels generally, but more particularly to that class of wheels having elastic tires.

The first object I have in view is to provide a wheel of the type known as "tangent spokes," in which the spokes shall not overlap or cross each other; and to this end my invention consists in providing the wheel with two sections or series of spokes, the long or rim series of the spokes being coupled together in groups of two or more, which groups are each connected with the hub by means of a shorter series of spokes.

Another object of my invention is to increase the elasticity of the rubber tire and at the same time dispense with a large proportion of the rubber now used in the construction of this class of tires without decreasing the elasticity or the outer bearing-surface of the tire. This object I accomplish by constructing the tire of crescent shape in cross-section and of open or cellular rubber, the outer portion being solid for appearance and protecting the cells from dirt.

Another object I have in view is to overcome as far as possible the tendency of the tire to become loose on the rim, and this I accomplish by providing the metal rim with an annular V-shaped groove, in which the acute-angled edges of the tire may be firmly cemented.

Another object I have in view is to increase the strength of the hollow rim or felly in proportion to the amount of metal employed therein; and to this end my invention consists of a tubular rim or felly of oval shape or substantially circular in cross-section and of increased thickness at the point where the spokes are attached. This tubular shape of the rim uses no more metal than the hollow crescent rim, and is much stronger, and has no hollow to hold useless dead rubber.

Another feature of my invention consists in constructing the metallic rim or felly of a series of short longitudinal sections detachably connected together, whereby any one of the sections may be removed when broken and replaced by a new and similar section.

There are other minor features of invention embodying the special combinations and the particular construction of the parts shown in the drawings, all of which will hereinafter more fully appear.

I will now proceed to describe my invention more specifically, so that others skilled in the art to which it appertains may apply the same, reference being had to the accompanying drawings, in which—

Figure 1 represents a side elevation of my preferred form of wheel complete. Fig. 2 is a perspective view of the branched hub. Fig. 3 is a detached view of the intermediate block for coupling the long and short spokes. Fig. 4 is a modification of the same. Figs. 5 and 6 are modifications of the hub and spoke attachments. Figs. 7 and 8 are a cross-section and bottom plan, respectively, of my preferred form of tire. Figs. 9 and 10 are respectively modifications of the same. Figs. 11, 12, and 13 are cross-sections showing modifications of the felly. Fig. 14 is a longitudinal section on line *x x* of Fig. 13. Fig. 15 is a longitudinal section on the line *z z* of Fig. 11. Fig. 16 represents a portion of a rim composed of a series of longitudinal sections. Figs. 17 and 18 represent sections of wheels, showing the form of attachment for the spokes.

The same symbols of reference indicate identical parts in all the figures.

In Fig. 1, which represents my improved wheel as a whole, A indicates the hub, and B and C, respectively, the rim and tire, which may be of any ordinary construction. The spokes are made in two series, an inner, which I shall term the "hub" series D, and an outer, which I shall term the "rim" series E. The rim series of spokes E may be connected at their outer end to the rim B in any suitable manner, and at their inner ends are connected in groups of two or more by a block F, preferably by screw-threading the same therein, as clearly shown in Fig. 3, which block is in turn connected by the short or hub spokes $d$ with the hub A. The hub A consists of two branched or star-shaped plates A, connected by a central sleeved shaft A'. The branches $a$ of each of the plates A are flanged inwardly and correspond in number to the number of groups of spokes on one side of the wheel. In the drawings I have shown the hub series of spokes D provided with heads $d'$ and passing through perforations in the flanges $a'$ on the branches of the hub, the opposite ends being screw-threaded in the block F; but this is not essential, as the branches $a$ may be made solid and the spokes D reversely screw-threaded at their opposite ends. I prefer to connect the spokes E in groups of three with the blocks F, which in turn are connected by only two short spokes $d$ with the hub A, said short spokes being in line with the outer spokes $e$ of the rim series to form substantially a continuation of the same. It will be observed that the rim-spokes $e$ of each group and their corresponding hub-spokes $d$ are tangent to the hub and are in line with a similar hub and rim spoke connected with the next adjacent branch of the hub, while the middle spokes $e'$ of each group are diametrically in line with the axis of the wheel. In order to further strengthen the wheel, I prefer to arrange the branched plates A of the sleeve A' so that the branches $a$ of one plate will be in a radial line intermediate the branches on the opposite plate, by which construction the groups of spokes are so located that the spokes leading to one plate A will alternate with those leading to the opposite plate, which construction also enables the spokes to be uniformly spaced around the rim of the wheel. Several advantages accrue from thus dividing the spokes between the hub and the rim into different series. The spokes can be more readily inserted and removed for adjusting the wheel. Any one of the spokes of either series can be removed without interfering with the remaining spokes, and can be replaced in an easy manner and require no solder. The spokes $d$ can be made larger and shorter and are fewer in number than the spokes $e$ $e'$ of the rim series.

The modification shown in Fig. 4 for connecting the two series of spokes consists of a ring $f$, having perforations therein for the passage of the spokes $e$, $e'$, and $d$, which are screw-threaded at their ends and provided with nuts $d^2$ inside the rim for tightening the spokes.

I may in some cases provide the branches $a$ of the hub with hooked bolts $g$, having a nut thereon for tightening the same against the hub, in which case I dispense with the short bolts $d'$ and employ in lieu thereof a continuous bolt $d^3$, which may be secured to the ring connection $f$, as shown in Figs. 4, 5, and 6.

Heretofore the elastic tires have been constructed of a circular form of solid rubber or with a convex outer surface and a flat base, or of a circular form with a longitudinal air space or chamber extending throughout the tire, all of which constructions are objectionable, for the reason that the tire is liable to be forced out of the rim by side pressure on the tire, owing to the lateral compression of the same. I overcome this objection by constructing the rim of tubular metal substantially circular or oval shape in cross-section, as shown at B, and form the tire crescent-shaped in cross-section, as shown at C, with sharp edges $c$ $c$. The tire is cemented to the convex surface $b$ of the rim with its edges extending as far or past the horizontal diameter of the rim. In order to protect said overlapping edges and to furnish a larger cementing-surface to the tire, as well as to re-enforce the rim B, I secure to said rim, preferably by brazing, a strip of sheet metal $b'$, the edges $b^2$ of which are flared outward substantially the horizontal diameter of the rim, thereby forming two longitudinal V-shaped grooves $b^3$ on each side of the rim, in which grooves the edges $c$ $c$ of the tire are firmly wedged and cemented. By this construction of rim and tire there is no waste or dead rubber, which is usually the case where the tire is round, or substantially round, and any side pressure on the tire C, for instance, in the direction of the arrow, Fig. 9, (which would be the case when leaning the wheel in turning corners or when the tire strikes against a slanting obstruction in its path,) would be overcome by the solid rim, owing to the thinnesss of the rubber at that point, and in case the tire should from any cause become separated from the projecting edge of the rim further side pressure would tend to hold the tire more firmly on the rim.

In order to provide a tire of increased elasticity or what I term a "cushioned" tire, I provide the concaved or cementing surface of the tire with a series of cavities $c^2$, or the tire may be provided with a series of longitudinal grooves or air-spaces $c^2$, extending throughout the tire, said grooves or air-spaces having dams $c^3$ extending across the same at intervals to divide the same into separate compartments or air-cells, as shown in Figs. 9, 10, and 11.

In Fig. 10 I have shown sections of rubber tubing $c^3$, inflated with air and inclosed at both ends inclosed in the elongated grooves $c^2$. Both the plain and cellular construction confine air in small spaces with no escape, so that the tire gains elasticity largely from the air, which must be compressed in order to flatten the tire. Were the spaces continuous, the air would simply move around to some other portion of the tire and no elasticity be gained therefrom, and there is no danger in a construction of this kind of the air escaping and the tire collapsing. When the rim is re-enforced by a thin metal sheet, as before described, the spokes $e$ $e'$ may be attached to the rim by providing them with heads $e^2$ at their outer ends and passing them from the outside through perforations in the rim before the tire is cemented thereto, an opening being formed in the outer or cementing edge of the rim for the passage of the head of the spoke.

In Fig. 11 I have shown the metal strip only perforated and a screw-threaded headed nipple secured therein between the strip $b$ and rim B, in which case the end of the spoke would be screw-threaded to engage said nipple.

In Fig. 13 I have shown the metal re-enforcing sheet provided with a longitudinal rib extending entirely around the wheel and the headed spoke $e$ secured therein.

In Figs. 7, 9, and 12 I have shown the rim formed of a single piece of metal bent to conform to the concave side of the tire and with the V-shaped grooves $b^3$ therein, the meeting edges $b^5 b^5$ overlapping each other at the point where the same is perforated to receive the spoke.

In Fig. 17 I have shown still another method of uniting the meeting edges $b^5 b^5$ of the tube. In this case instead of overlapping the edges of the metal forming the tube, I turn the same in toward and perpendicular to the axis of the wheel, then bend the rib formed thereby alternately to the right and left, thereby forming a waving rib, and I secure the end of the spoke therein, as shown in Fig. 7.

In Fig. 18 I have shown the overlapping edges dovetailed together and secured to the body portion of the rim, every third, fourth, or fifth dovetail portion being turned alternately to the right and left and perforated for the reception of the spoke.

As commonly constructed the rims of such wheels are made of a continuous longitudinal tube formed of a single strip of material or two or more longitudinal strips secured together, so that when the rim is broken the remainder of the rim must be discarded, which results in a very considerable loss to the purchaser. To avoid as far as possible this loss I construct the rim of a series of independent or separable sections G of tubing, as shown in Fig. 16, adapted to be secured together by inserting the end of one section in the end of the adjacent section and clamping the same therein by means of a pinch-bind. By this means in case the rim becomes broken, such broken section or sections may be readily removed and replaced by a new section without discarding the remainder of the rim and at a trifling cost to the purchaser.

In Fig. 12 I have shown another modification of my rim and tire, in which case I construct the rim of substantially crescent form, but provide the same with the longitudinal V-shaped grooves adapted to receive corresponding wedge-shaped ribs on the tire. While this construction practically accomplishes one object of my invention—namely, a wedge-shaped cementing-surface—still a large proportion of the rubber, or that portion secured to the concave portion of the rim, would be useless or dead rubber.

I am aware that tires of this general character have been contructed of two layers of rubber of different grades as regards degree of vulcanization, and I do not herein claim the same; but What I do claim, and desire to secure by Letters Patent, is—

1. A rubber tire crescent-shaped in cross-section, having its inner face provided with longitudinal and transverse series of ribs or tongues, substantially as and for the purposes described.

2. A rubber-tire crescent-shaped in cross-section, having its inner face provided with two or more grooves, and dams across said grooves dividing the same into compartments, substantially as and for the purposes described.

3. In a wheel, the combination, with a metallic rim, substantially circular in cross-section, of a sheet-metal strip secured to the inner side of said rim and having its edges projecting at a tangent from the sides of said rim, forming V-shaped grooves, and an elastic tire secured to said rim, the edges of said tire fitting in said grooves, substantially as and for the purposes described.

4. In a wheel, the combination, with a rim substantially circular in cross-section, of an elastic tire substantially crescent-shaped in cross-section, secured to said rim, and a re-enforcing strip secured to the inner side of said rim and having its edges overlapping the edges of the tire, substantially as and for the purposes described.

5. In a wheel, the combination, with a rim, of an elastic tire secured thereto, a re-enforcing strip secured to said rim and having its edges overlapping the tire, said re-enforcing strip having a longitudinal rib in which the spokes are secured, substantially as and for purposes described.

6. In a wheel, the combination, with a rim, of an elastic tire secured thereto, a re-enforcing strip secured to the rim and having perforations therein and internally-screw-threaded head-nipples secured in said perforations and adapted to receive the screw-threaded end of the spoke, substantially as and for the purposes described.

7. In a wheel, the combination of the rim having longitudinal V-shaped grooves in its periphery and provided with perforations for the passage of the spokes, said rim being re-enforced at the point of attachment of the spokes, and an elastic tire having sharp edges adapted to enter the longitudinal grooves, substantially as and for the purposes described.

8. In a velocipede or other wheel, the combination, with the hub, of spokes arranged tangentially thereto, said spokes consisting of a hub series and a rim series, and means, substantially as described, for connecting said series, substantially as and for the purposes described.

9. In a wheel for velocipedes and other vehicles, the combination of a branched or star-shaped hub, the spokes consisting of a hub series and a rim series, said rim series coupled together in groups of three or more, two spokes at least of each group being tangent to the hub, and means, substantially as described, of connecting said two series, substantially as and for the purposes described.

10. In a wheel for velocipedes and other vehicles, the combination, with a hub consisting of two branches or star-shaped plates secured one at each end of a sleeve, of the spokes arranged in groups of three or more, the spokes of one group alternating with the spokes of the next adjacent group, and said groups alternately connecting with the opposite ends of the hub, substantially as and for the purposes described.

11. In a wheel for velocipedes or other vehicles, the combination, with a branched or star-shaped hub, of an inner and outer series of spokes, the inner series connecting the outer series in groups of three or more spokes each with two adjacent branches of the hub, substantially as and for the purposes described.

12. A rim for wheels, said rim consisting of short sections of tubes, the end of one section adapted to enter the end of the adjacent section and secured thereto by a pinch-bind, substantially as and for the purposes described.

13. A rim adapted for the reception of a rubber tire having a regularly-convexed face transversely provided with inwardly-curved flanges at its base, the outline of the convexed portion and the flanges being struck from two centers, whereby crescentric recesses are formed for the reception of the tire, substantially as and for the purposes described.

In testimony whereof I affix my signature in presence of two witnesses.

CHARLES E. DURYEA.

Witnesses:
R. S. DURYEA,
JOHN W. JACKSON.